(12) United States Patent
Ohmura (10) Patent No.: US 12,301,057 B2
(45) Date of Patent: May 13, 2025

(54) MOTOR WITH CASING AXIALLY GUIDED BY PILLARS

(71) Applicant: MINEBEA MITSUMI Inc., Nagano (JP)

(72) Inventor: Jun Ohmura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 210 days.

(21) Appl. No.: 17/319,541

(22) Filed: May 13, 2021

(65) Prior Publication Data

US 2021/0367460 A1    Nov. 25, 2021

(30) Foreign Application Priority Data

May 21, 2020  (JP) ................................ 2020-088554

(51) Int. Cl.
*H02K 1/18*     (2006.01)
*H02K 5/04*     (2006.01)

(52) U.S. Cl.
CPC ............... *H02K 1/185* (2013.01); *H02K 5/04* (2013.01)

(58) Field of Classification Search
CPC ............ H02K 1/185; H02K 1/18; H02K 5/04; H02K 1/146; H02K 1/14; H02K 1/165; H02K 1/16; H02K 1/17; H02K 3/12; H02K 3/28; H02K 3/345; H02K 2213/03
See application file for complete search history.

(56) References Cited

U.S. PATENT DOCUMENTS

| | | | | |
|---|---|---|---|---|
| 6,043,583 A | * | 3/2000 | Kurosawa | H02K 1/146 310/43 |
| 2005/0067914 A1 | * | 3/2005 | Baba | H02K 1/146 310/214 |
| 2015/0222151 A1 | * | 8/2015 | Semken | H02K 1/278 29/452 |
| 2019/0181700 A1 | * | 6/2019 | Nishikawa | H02K 1/148 |

FOREIGN PATENT DOCUMENTS

| | | | |
|---|---|---|---|
| JP | 2009-240135 A | | 10/2009 |
| JP | 2018-137864 A | | 8/2018 |
| JP | 2020-039218 A | | 3/2020 |
| KR | 1332151 B1 | * | 11/2013 |

OTHER PUBLICATIONS

English translation of KR-1332151-B1 (Year: 2013).*
First Office Action dated Jan. 15, 2024 for corresponding Japanese Application No. 2020-088554 and English translation.

* cited by examiner

*Primary Examiner* — Tulsidas C Patel
*Assistant Examiner* — Joshua Kiel M Rodriguez
(74) *Attorney, Agent, or Firm* — Chrisman Gallo Tochtrop LLC (57) ABSTRACT

A stator of a motor includes a plurality of magnetic bodies stacked in a direction of a central axis (X), a case configured to hold the plurality of magnetic bodies, a cover configured to cover the case, and a pillar including a guiding part configured to guide the plurality of magnetic bodies in the direction of the central axis (X). The plurality of magnetic bodies include a guided part guided by the pillar. The pillar includes an outer peripheral surface including positioning parts. The positioning parts determine relative positions of the case and the cover in an axial direction.

5 Claims, 12 Drawing Sheets

MOTOR WITH CASING AXIALLY GUIDED BY PILLARS

CROSS-REFERENCE TO RELATED APPLICATIONS

This application claims the benefit of Japanese application No. 2020-088554, filed May 21, 2020, the entire disclosure of which is hereby incorporated herein by reference.

TECHNICAL FIELD

The present invention relates to a motor.

BACKGROUND ART

Soft magnetic materials such as a silicon steel plate susceptible to changes in magnetization are employed for a stator material of a motor. Since such a soft magnetic material exhibits electrical conductivity, and this may generate eddy currents, sheets having a thickness from about 0.1 to about 0.5 mm are stacked and employed to suppress the eddy currents. However, if an adhesive is applied between the plurality of sheets when forming a stacked body from the plurality of sheets, the space factor of the magnetic material decreases due to the volume of the adhesive, and thus, the motor efficiency may decrease.

To solve this problem, a motor provided with a metal fastening mechanism in an opening of a stacked body obtained by stacking soft magnetic thin strips has been proposed. In such a motor, since a plurality of thin strips are positioned by the metal fastening mechanism, the plurality of thin strips can be processed simultaneously, and decrease in the space factor of the magnetic material is suppressed.

The sheet constituting the stacked body is preferably formed thinly as described above, and thus, the strength easily decreases. Furthermore, when an amount of additives added to iron and the like constituting the sheet is adjusted or when the sheet is formed by an amorphous alloy, with the object of improving the magnetic properties of the sheet, the strength and elasticity of the sheet may decrease. If the strength and elasticity of the sheet are low, there may occur a defect in the sheet, for example, the sheet may be damaged, that is, the sheet may crack due to a load applied to the stacked body when the metal fastening mechanism is fastened.

CITATION LIST

Patent Document

Patent Document 1: JP 2009-240135 A

SUMMARY OF INVENTION

Technical Problem

Therefore, the present invention has been contrived in view of the above situation, and an example of an object of the present invention is to provide a motor capable of suppressing damage to a magnetic body while improving the space factor of the magnetic body.

Solution to Problem

The above problems are solved by the present invention described below. That is, a motor according to the present invention includes a plurality of magnetic bodies stacked in an axial direction, a case configured to hold the plurality of magnetic bodies, a cover configured to cover the case, and a pillar including a guiding part configured to guide the plurality of magnetic bodies in the axial direction, and in the motor, the plurality of magnetic bodies include a guided part guided by the pillar, the pillar includes an outer peripheral surface including a positioning part, and the positioning part determines relative positions of the case and the cover in the axial direction.

In the present invention, the positioning part preferably positions each of the case and the cover.

In the present invention, the motor preferably includes an insulator disposed between the case and the cover in the axial direction, the insulator includes a holding body configured to hold the plurality of magnetic bodies and a lid body, and outer peripheral parts of the plurality of magnetic bodies are exposed from the holding body in a radial direction.

In the present invention, the holding body preferably includes a bottom part at a side of the case and a wall part provided at the bottom part, and the lid body is supported by an end part of the wall part at a side of the cover.

In the present invention, the motor preferably includes a housing fixed to the case or the cover.

DESCRIPTION OF EMBODIMENTS

Figure 1:
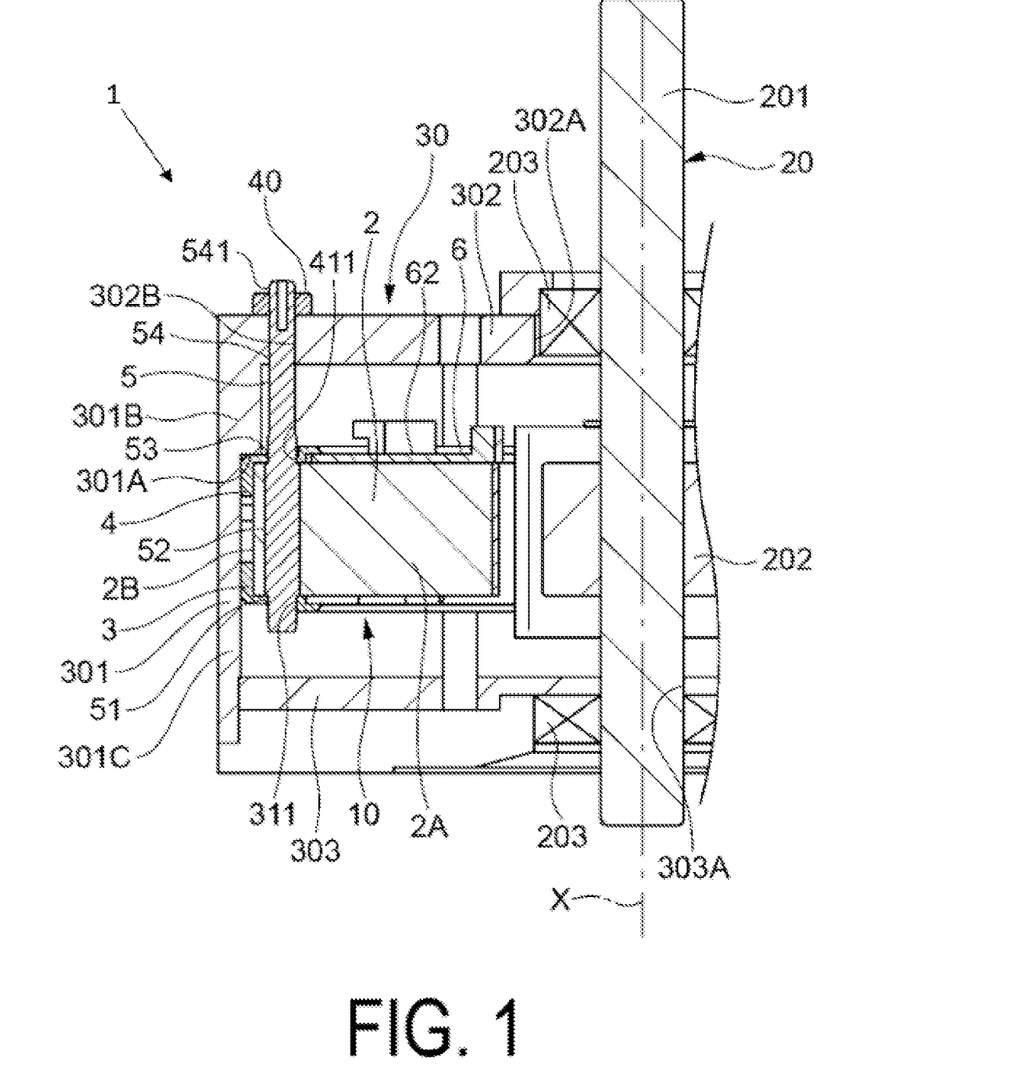
FIG. 1 is a cross-sectional view of a motor according to an embodiment being one example of the present invention.
Figure 2:
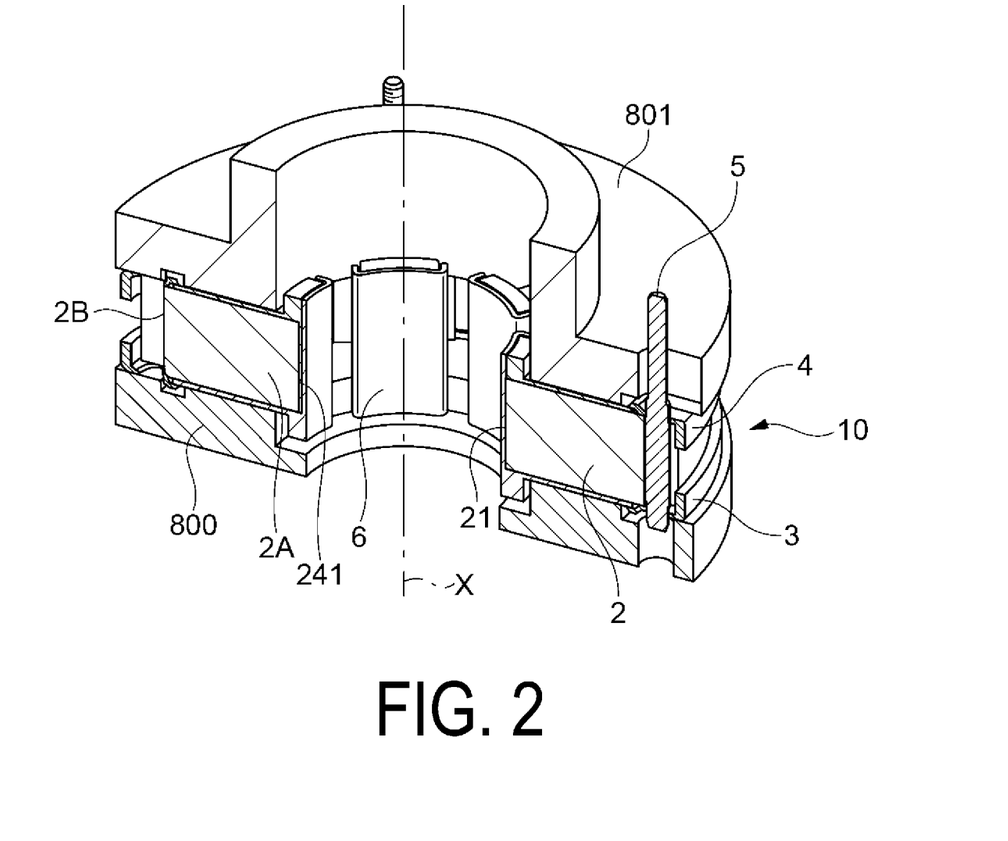
FIG. 2 is a perspective view illustrating a state of manufacturing a stator of the motor according to the embodiment being one example of the present invention.
Figure 3:
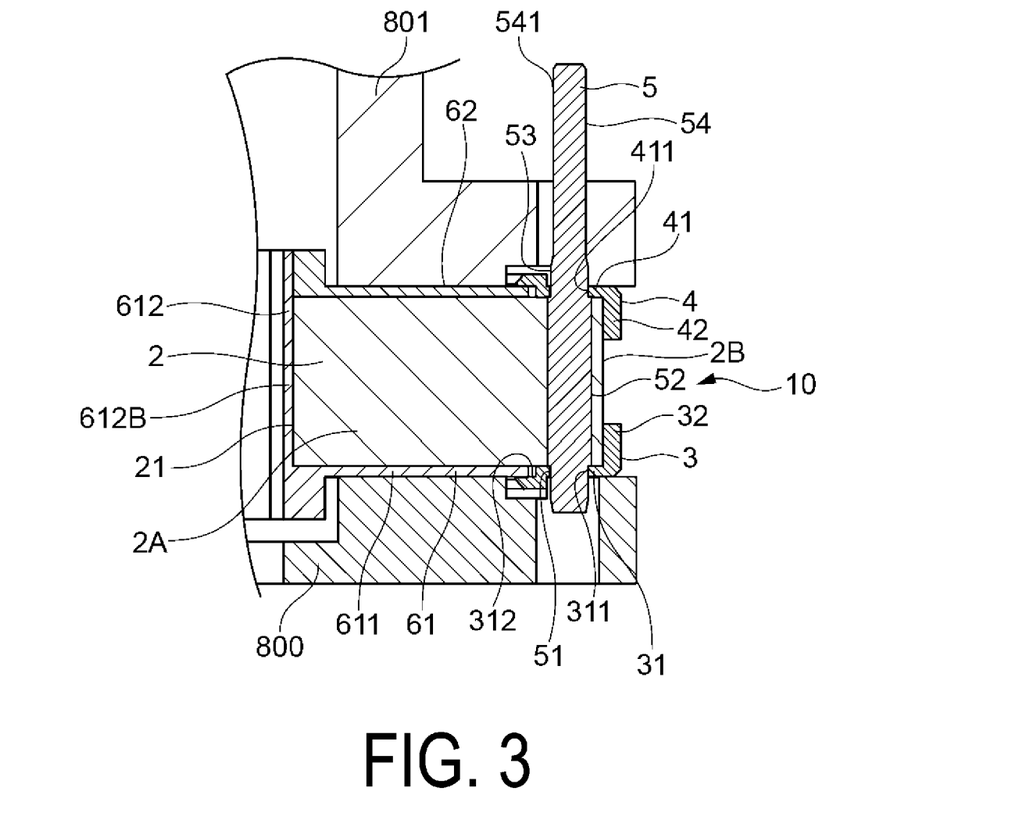
FIG. 3 is a cross-sectional view illustrating a state of manufacturing the stator of the motor according to the embodiment being one example of the present invention.
Figure 4:
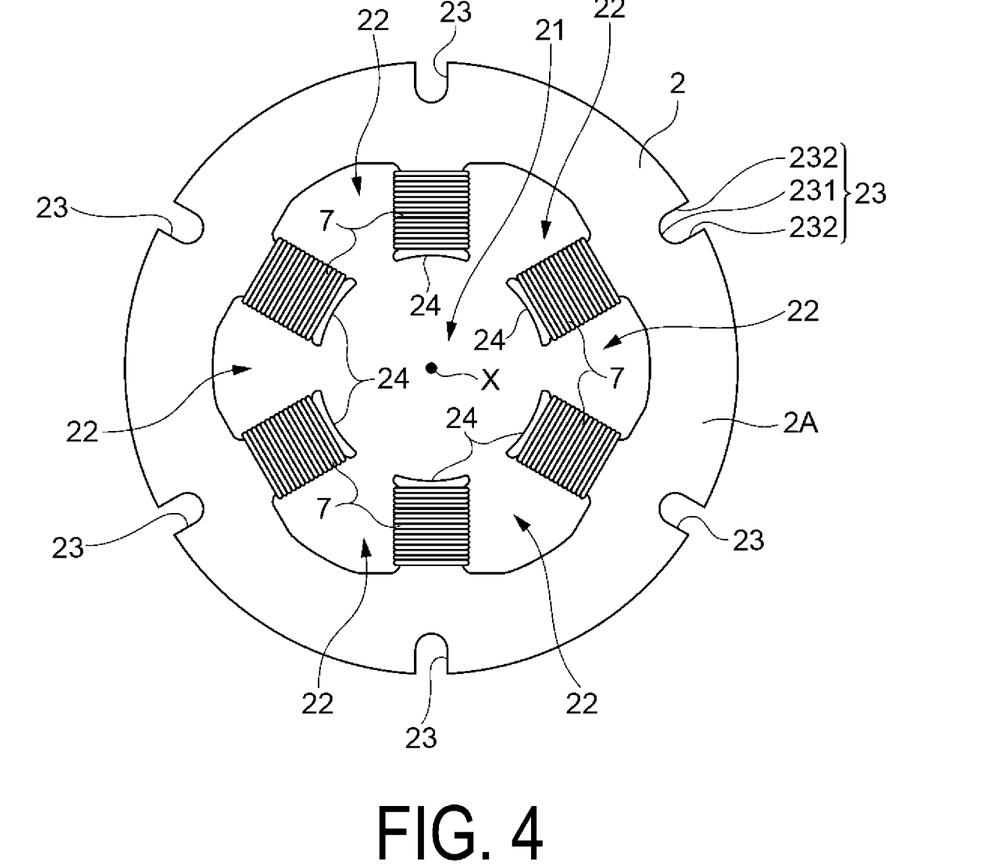
FIG. 4 is a plan view of a stator core and a coil employed in the motor according to the embodiment being one example of the present invention.

Embodiments of the present invention will be described below with reference to the drawings. FIG. 1 is a cross-sectional view of a motor 1 according to an embodiment being one example of the present invention. FIG. 2 is a perspective view illustrating a state of manufacturing a stator 10 of the motor 1. FIG. 3 is a cross-sectional view illustrating a state of manufacturing the stator 10. FIG. 4 is a plan view of a stator core 2 and a coil 7 employed in the motor 1.

The motor 1 according to the present embodiment includes the stator 10, a rotor 20, and a housing 30. The stator 10 includes the stator core 2 being a stacked body of a plurality of magnetic bodies 2A, a case 3 configured to hold the stator core 2, a cover 4 configured to cover the case 3, pillars 5 configured to guide the plurality of magnetic bodies 2A in a direction of a central axis X, an insulator 6 disposed between the case 3 and the cover 4, and the coil 7. Each of the pillars 5 includes, at an outer peripheral surface 50, positioning parts 511 and 531 configured to determine relative positions of the case 3 and the cover 4 in the direction of the central axis X. As illustrated in FIGS. 1 and 2, the entirety of each of the stator core 2, the case 3, the cover 4, and the insulator 6 constituting the stator 10 are formed in an annular shape with a rotation axis (the central axis X) of the rotor 20 as the center.

In the following description, for convenience, an upper side (a side of the cover 4) in FIGS. 1 to 3 is referred to as an upper side or an upward direction, and a lower side (a side of the case 3) is referred to as a lower side or a downward direction. However, this does, of course, not express an up-down relationship in a gravitational direction. Furthermore, in the following description, a direction along a circumference with the central axis X as the center may simply be referred to as a "circumferential direction", a radial direction of a circle with the central axis X as the center may simply be referred to as a "radial direction", and a plane substantially orthogonal to the central axis X may simply be referred to as an "orthogonal plane".

The magnetic bodies 2A constituting the stator core 2 are sheet members (for example, ultra-thin strips having a thickness of 25 µm) formed of an amorphous alloy. The stator core 2 is configured by stacking, for example, 400 of such sheet members. For the material of the magnetic bodies 2A, a magnetic body typically employed for a member of a stator may be employed for the magnetic bodies 2A; however, an electromagnetic steel plate such as a silicon steel plate having excellent electromagnetic properties, an amorphous alloy, a nanocrystal alloy, and the like are preferably employed. Each of the magnetic bodies 2A desirably has a thickness for causing almost no eddy current, and specifically, preferably a thickness of 100 µm or less, and more preferably a thickness of 25 µm or less. In view of both handling and electromagnetic properties, the thickness of 25 µm in the present embodiment is most preferable. Note that the material, the thickness, and the number of stacked layers of the magnetic bodies 2A are not limited to those described above, and may be appropriately selected according to an application of the motor and the like. The plurality of magnetic bodies 2A constituting the stator core 2 have the same shape, and a shape of the stator core 2 including the plurality of magnetic bodies 2A in a stacked state will be mainly described, below.

As illustrated in FIG. 4, the stator core 2 includes an opening 21 formed in the center, six slots (electric wire passing parts) 22 being through holes extending in the direction of the central axis X, six guided parts 23 having a notched shape (recess shape) formed at an outer peripheral surface, and a total of six teeth 24 extending along the radial direction between the adjacent electric wire passing parts 22.

The magnetic bodies 2A constituting the stator core 2 are disposed along the orthogonal plane. The electric wire passing parts 22 are each formed in a fan shape continuous with the opening 21 at an inner peripheral side. A total of six coils 7 are formed by winding an electric wire around each of the teeth 24 and the insulator 6 described later such that the electric wire passes through the two adjacent electric wire passing parts 22. In FIG. 4, for convenience of explanation, only the stator core 2 and the coils 7 are illustrated; however, in practice, the electric wire is not directly wound around the teeth 24, but the insulator 6 is disposed between the teeth 24 and the electric wire.

The guided part 23 includes a curved surface part 231 having a semicircular shape when viewed from the direction of the central axis X and a pair of flat surface parts 232 connected to both end parts of the curved surface part 231, and is formed in a U-shape when viewed from the direction of the central axis X. That is, the guided part 23 is obtained by forming a part of the outer peripheral surface of the stator core 2 into a recess shape. The guided part 23 is disposed at an outer peripheral side with respect to each of the teeth 24. As described later, the pillars 5 pass through three of the six guided parts 23. However, three or more of the guided parts 23 are preferably formed, so that the magnetic bodies 2A do not shift from a predetermined position within the orthogonal plane while being guided along the direction of the central axis X, and all of the guided parts 23 may be used, or some of the guided parts 23 may not be used.

Figure 7:
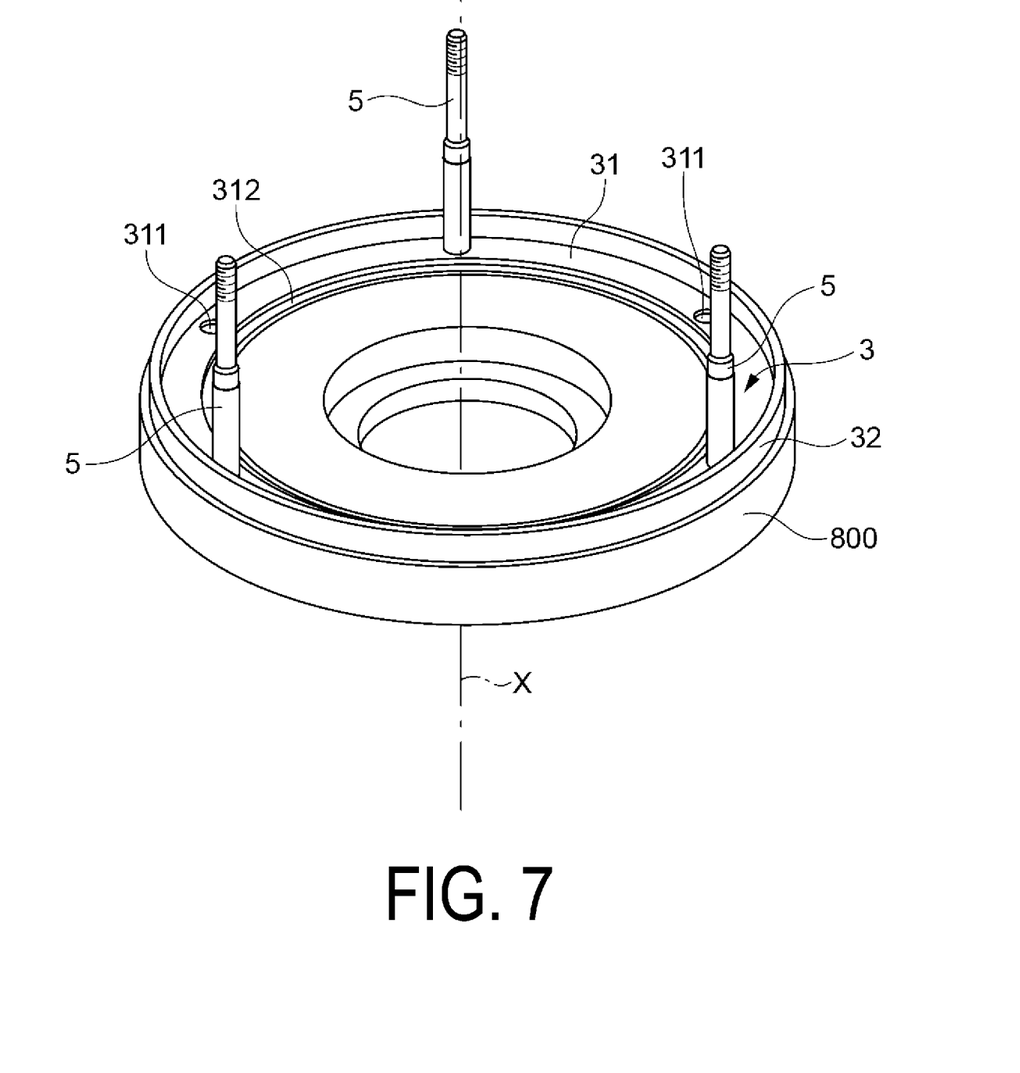
FIG. 7 is a perspective view illustrating a process of manufacturing the stator of the motor according to the embodiment being one example of the present invention.

As illustrated in FIG. 7, the case 3 includes an annular part 31 with the central axis X as the center and a cylindrical part 32 extending upward from an outer peripheral edge of the annular part 31 and having the central axis X as the center, the annular part 31 and the cylindrical part 32 are formed integrally, and the case 3 is formed of a non-magnetic metal material, for example. A plurality of press-fitted parts 311 configured to allow the pillars 5 to be press-fitted, are formed in the annular part 31. In the present embodiment, each of the press-fitted parts 311 is formed in a shape of a through hole; however, the press-fitted part 311 may be formed into a non-through press-fitted part having a recess shape. Furthermore, six of the press-fitted parts 311 are formed in the annular part 31, and the pillars 5 are press-fitted into three of the press-fitted parts 311, as described later. The number of the press-fitted parts 311 formed in the annular part 31 is only required to be equal to or greater than the number of the pillars 5, and all of the press-fitted parts 311 may be used, or some of the press-fitted parts 311 may not be used. Furthermore, a recess part 312 used for positioning a later-described bottom part 611 is formed at a top surface of the annular part 31.

Figure 12:
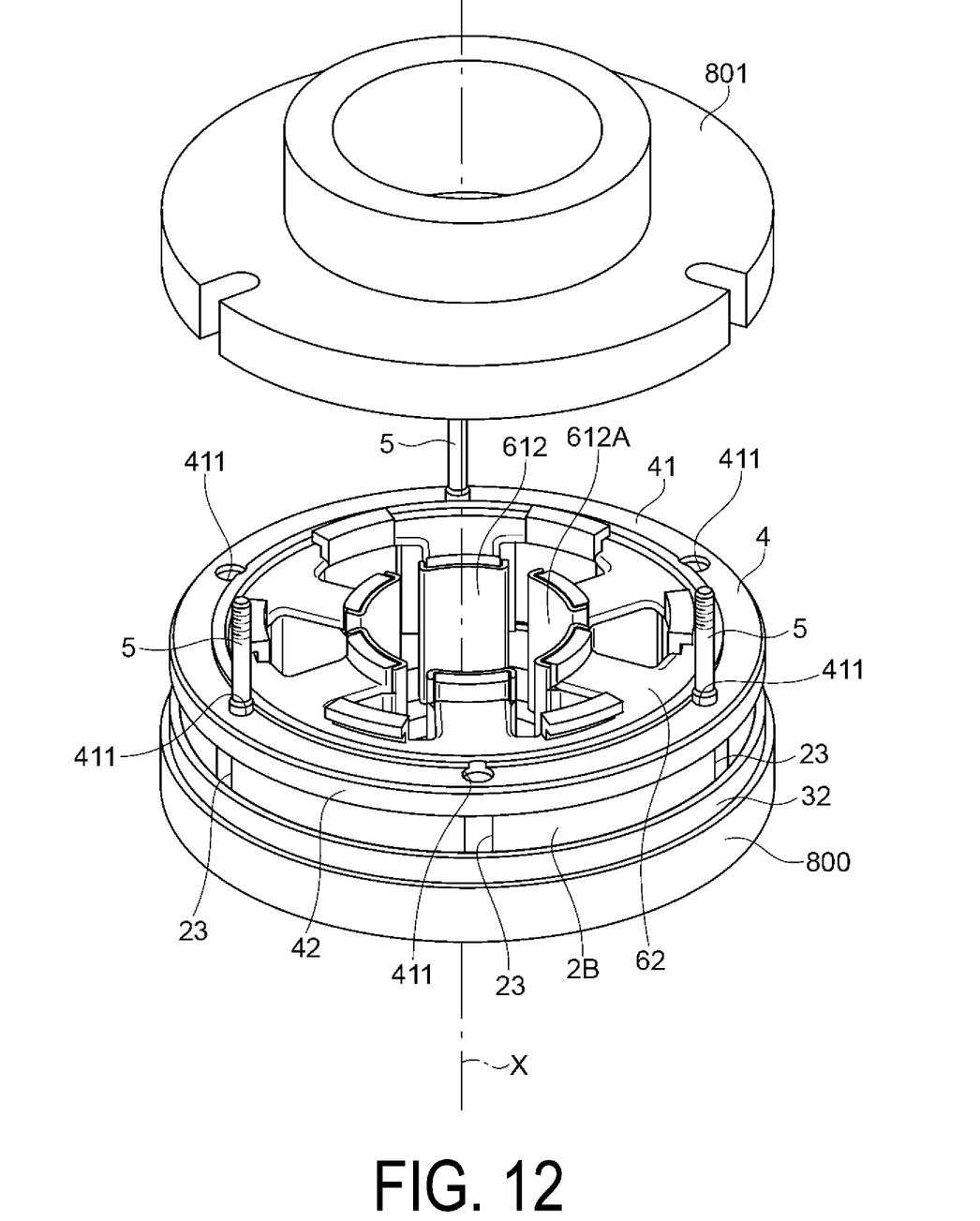
FIG. 12 is a perspective view illustrating the process of manufacturing the stator of the motor according to the embodiment being one example of the present invention.

As illustrated in FIG. 12, the cover 4 includes an annular part 41 with the central axis X as the center and a cylindrical part 42 extending downward from an outer peripheral edge of the annular part 41 and having the central axis X as the center, the annular part 41 and the cylindrical part 42 are formed integrally, and the cover 4 is formed of a non-magnetic metal material, for example. A plurality of press-fitted parts 411 configured to allow the pillars 5 to be press-fitted, are formed in the annular part 41. In the present embodiment, each of the press-fitted parts 411 is formed in a shape of a through hole; however, the press-fitted part 411 may be formed as a non-through press-fitted part having a recess shape. Furthermore, six of the press-fitted parts 411 are formed in the annular part 41, and the pillars 5 are press-fitted into three of the press-fitted parts 411, as described later. The number of the press-fitted parts 411 formed in the annular part 41 is only required to be equal to or greater than the number of the pillars 5, and all of the press-fitted parts 411 may be used, or some of the press-fitted parts 411 may not be used.

The cover 4 is disposed above the case 3 while separated from the case 3, and covers the case 3 from above (so that the case 3 is hidden by the cover 4 when viewed from above). That is, the case 3 and the cover 4 are disposed so as to face each other in the direction of the central axis X. An interval between the annular part 31 and the annular part 41 is substantially equal to or slightly larger than the thickness of the stator core 2 (a dimension of the stator core 2 in the direction of the central axis X). The press-fitted part 311 of the case 3 and the press-fitted part 411 of the cover 4 are disposed at substantially the same position in the circumferential direction so as to overlap each other when viewed from the direction of the central axis X. An upper end part of the cylindrical part 32 and a lower end part of the cylindrical part 42 are disposed separately, and a part of an outer peripheral part 2B of the stator core 2 is exposed.

Figure 5:
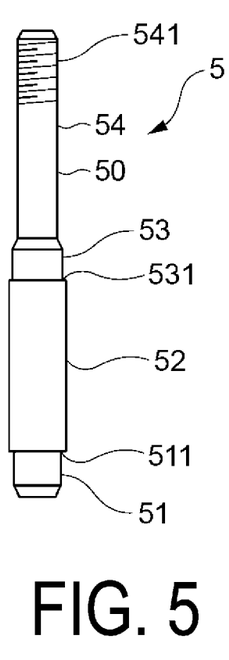
FIG. 5 is a side view of a pillar employed in the motor according to the embodiment being one example of the present invention.

The pillar 5 is a cylindrical member extending along the direction of the central axis X, and three of the pillars 5 are used in the present embodiment. As illustrated in FIG. 5, the pillar 5 includes a first press-fitting portion 51 to be press-fitted into the press-fitted part 311, a non-press-fitting portion 52 disposed between the annular part 31 and the annular part 41, and a second press-fitting portion 53 to be press-fitted into the press-fitted part 411, in this order from the lower side. Furthermore, the pillar 5 includes a guiding part 54 extending upward from the second press-fitting portion 53. On the outer peripheral surface 50 of the pillar 5, a male screw part 541 is formed at an end portion of the guiding part 54. The pillar 5 is only required to be formed of a non-magnetic metal material, for example, and the pillar 5 may be formed of a resin having sufficient strength.

The outer diameter of the first press-fitting portion 51 is formed to be slightly larger than the inner diameter of the press-fitted part 311, and the outer diameter of the second press-fitting portion 53 is formed to be slightly larger than the inner diameter of the press-fitted part 411. The outer diameter of the non-press-fitting portion 52 is larger than both the outer diameter of the first press-fitting portion 51 and the outer diameter of the second press-fitting portion 53, and the non-press-fitting portion 52 cannot pass through the press-fitted parts 311 and 411. Due to such differences in outer diameter, a first step part 511 is formed between the first press-fitting portion 51 and the non-press-fitting portion 52, and a second step part 531 is formed between the second press-fitting portion 53 and the non-press-fitting portion 52, at the outer peripheral surface 50 of the pillar 5. The outer diameter of the guiding part 54 is smaller than the outer diameter of the second press-fitting portion 53, and the guiding part 54 can pass through the press-fitted part 411.

When the first press-fitting portion 51 is press-fitted into the press-fitted part 311, the first step part 511 comes into contact with the annular part 31 (a peripheral portion of the press-fitted part 311), and thus, an insertion of the first press-fitting portion 51 beyond a predetermined position is restricted. That is, the first step part 511 positions the pillar 5 and the case 3 in the direction of the central axis X. When the second press-fitting portion 53 is press-fitted into the press-fitted part 411, the second step part 531 comes into contact with the annular part 41 (a peripheral portion of the press-fitted part 411), and thus, an insertion of the second press-fitting portion 53 beyond a predetermined position is restricted. That is, the second step part 531 positions the pillar 5 and the cover 4 in the direction of the central axis X. Since both the case 3 and the cover 4 are positioned with respect to the pillar 5, the relative positions of the case 3 and the cover 4 are determined in the direction of the central axis X. That is, since the two step parts 511 and 531 position both the case 3 and the cover 4, the two step parts 511 and 531 function as a positioning part configured to determine the relative positions of the case 3 and the cover 4 in the direction of the central axis X. As described above, the interval between the annular parts 31 and 41 in the direction of the central axis X is determined, and thus, the annular parts 31 and 41 do not come closer to each other than the interval.

As illustrated in FIGS. 8 to 11, the insulator 6 includes, as separate components, a holding body 61 disposed at a side of the case 3 and configured to hold the stator core 2 and a lid body 62 disposed at a side of the cover 4. In the present embodiment, the holding body 61 includes six independent components. However, in the following description, a state of the completely assembled stator 10 will be used as a reference, and the six components will be collectively described in the description of the shape and the arrangement of each part. The holding body 61 includes a bottom part 611 disposed at the side of the case 3 and placed on the annular part 31 and a wall part 612 provided at the bottom part 611 and extending upward. Any member can be employed for the holding body 61 and the lid body 62 as long as the member has insulating properties, and a known resin material (having any form such as a mass of resin, a plate-like resin, and a film-like resin) typically employed for an insulator is suitably employed.

The bottom part 611 includes a through hole at a position overlapping the opening 21 and the electric wire passing part 22 of the stator core 2, is formed in a plate shape having a circular arc profile, and is disposed in the recess part 312. The wall part 612 includes a first wall part 612A inserted into the opening 21 and a second wall part 612B inserted into the electric wire passing part 22. The entire first wall part 612A is formed in a cylindrical shape, and a plurality of slits 613 extending along the direction of the central axis X are formed. The second wall part 612B is disposed to sandwich each of the teeth 24 of the stator core 2 with two plate-shaped portions 24a. That is, the second wall part 612B includes a total of six pairs (12 sheets) of plate-shaped portions. The plate-shaped portions constituting the second wall part 612B extend in the radial direction along an inner peripheral edge of the electric wire passing part 22, and both end parts in the radial direction are bent toward the circumferential direction. The wall height (dimension in the direction of the central axis X) of the first wall part 612A is formed to be higher than the wall height of the second wall part 612B.

Two plate-shaped portions of the second wall part 612B inserted into the same electric wire passing part 22 are disposed at intervals from each other, that is, the holding body 61 is open at the inner peripheral side and the outer peripheral side. The holding body 61 includes six independent components, and thus, if the angles of the teeth 24 differ from each other, the positions of the six components can be adjusted to absorb the difference in the angles. Note that, when the difference in the angles of the teeth 24 is small or the difference in the angles is unlikely to occur, the six components may be coupled to form one single component.

Figure 6:
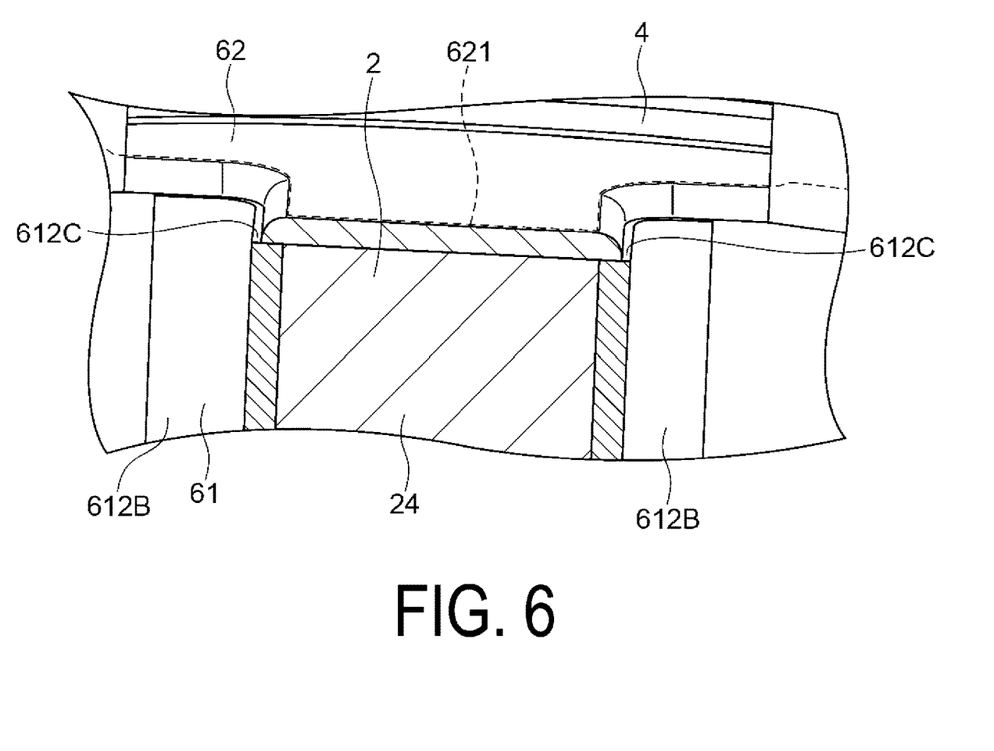
FIG. 6 is a cross-sectional view of a stator of the motor according to the embodiment being one example of the present invention.

The lid body 62 includes a through hole at a position overlapping the opening 21 and the electric wire passing part 22 of the stator core 2 and is formed into a disk shape. That is, the lid body 62 is configured to cover the stator core 2 (in particular, the teeth 24) from above. As illustrated in FIG. 6, a fitted part 621 capable of being fitted with an upper end edge of the second wall part 612B is formed at a lower surface of the lid body 62. The fitted part 621 may be, for example, a convex part, and is formed to be along an upper end part of the plate-shaped portions constituting the second wall part 612B. Thus, the lid body 62 is supported by an end part 612C of the second wall part 612B at the side of the cover 4. The lid body 62 is supported by the holding body 61, and thus, the load of the lid body 62 is not applied to the stator core 2. A portion of the lid body 62 overlapping the teeth 24 extends upward along the first wall part 612A at an end part at the inner peripheral side. Similarly, a portion of the lid body 62 overlapping an outer peripheral edge of the electric wire passing part 22 extends upward.

The insulator 6 covers the stator core 2 from the inner peripheral side and from above and below in the direction of the central axis X, but does not cover the stator core 2 from the outer peripheral side. That is, in the radial direction, the outer peripheral parts 2B of the plurality of magnetic bodies 2A constituting the stator core 2 are exposed from the holding body 61.

As described above, the coil 7 is formed by winding an electric wire, and thus, the electric wire passes through the two adjacent electric wire passing parts 22. At this time, the electric wire constituting the coil 7 is not in direct contact with the stator core 2, but is wound around the insulator 6. That is, in one complete winding of the electric wire, the electric wire passes below the bottom part 611, outside a plate-shaped portion of the second wall part 612B (at the opposite side of the teeth 24), above the lid body 62, and outside a plate-shaped portion adjacent to the plate-shaped portion (at the opposite side of the teeth 24), to return again below the bottom part 611.

The rotor 20 includes an output shaft 201, a magnet 202, and a bearing 203. The magnet 202 is disposed inside the first wall part 612A of the insulator 6. When current flows through the coil 7, the rotor 20 rotates by the magnetic interaction with the magnet 202.

The housing 30 is formed in a substantially cylindrical shape and includes a tubular part 301 having a cylindrical shape with the central axis X as the center, a first plate part 302 having a disk shape disposed at one end side (the side of the cover 4) of the tubular part 301 in the direction of the central axis X, and a second plate part 303 having a disk shape disposed at the other end side (the side of the case 3) of the tubular part 301 in the direction of the central axis X. The tubular part 301 and the first plate part 302 are integrally formed, and the second plate part 303 is configured to be detachable from and attachable to the tubular part 301. The housing 30 accommodates the entire stator 10 as described above, a part of the output shaft 201 of the rotor 20, and the magnet 202.

Openings 302A and 303A are formed respectively in the first plate part 302 and the second plate part 303, the output shaft 201 passes through the openings 302A and 303A, and the bearing 203 of the rotor 20 is provided in each of the openings 302A and 303A. A through hole 302B for passing the pillar 5 is formed in the first plate part 302. A portion of the pillar 5 formed with the male screw part 541 passes through the through hole 302B and protrudes outward from the housing 30. A step part 301A is formed at the inner peripheral surface of the tubular part 301 of the housing 30 to sandwich and hold the cover 4 from the direction of the central axis X. An upper portion 301B having a large thickness and a lower portion 301C having a small thickness are formed in the tubular part 301, and the step part 301A is formed by the difference in inner diameters between the upper portion 301B and the lower portion 301C.

When a nut 40 is screwed onto the male screw part 541 and tightened, the step part 301A serves as a portion receiving the load, the cover 4 and the nut 40 sandwich a part of the housing 30 (an outer edge part of the first plate part 302 and the upper portion 301B), and a compressive force in the direction of the central axis X is applied to a part of the housing 30. Thus, the cover 4 is fixed to the housing 30 together with the pillar 5 and the nut 40. Furthermore, the pillar 5 is press-fitted into the case 3, and thus, the case 3 is indirectly fixed to the housing 30 via the pillar 5.

Here, a detailed method of manufacturing the stator 10 and a procedure of the method will be described. First, as illustrated in FIG. 7, the case 3 is placed on a receiving jig 800 having an annular shape, and the pillar 5 is press-fitted into each of the three press-fitted parts 311. The receiving jig 800 restricts the movement of the case 3 in a plane orthogonal to the central axis X, and does not interfere with the pillar 5 protruding from the lower surface of the case 3. At this time, the first press-fitting portion 51 of the pillar 5 is press-fitted into the press-fitted part 311 until the first step part 511 comes into contact with the annular part 31. Therefore, the insertion amount of the pillar 5 can be made constant.

Figure 8:
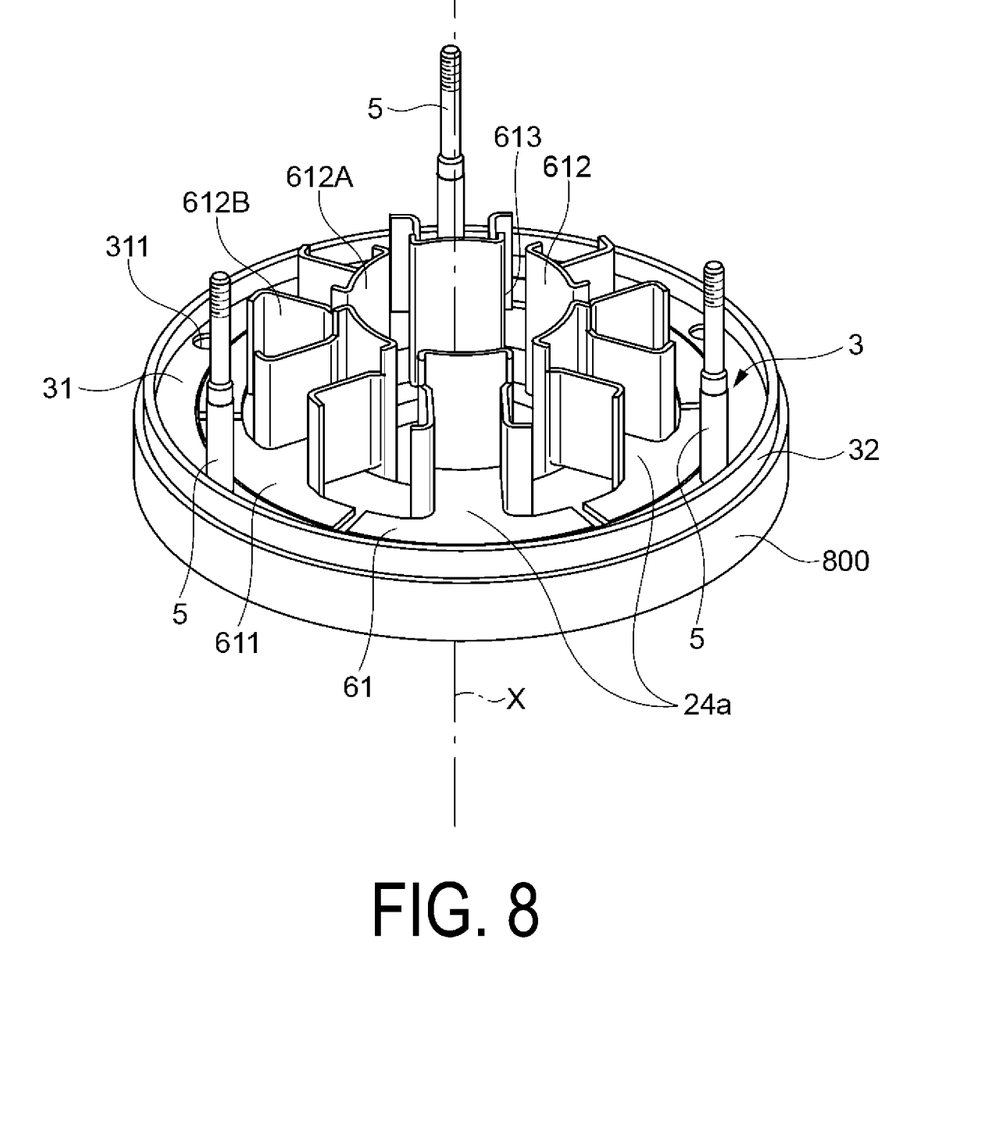
FIG. 8 is a perspective view illustrating the process of manufacturing the stator of the motor according to the embodiment being one example of the present invention.
Figure 9:
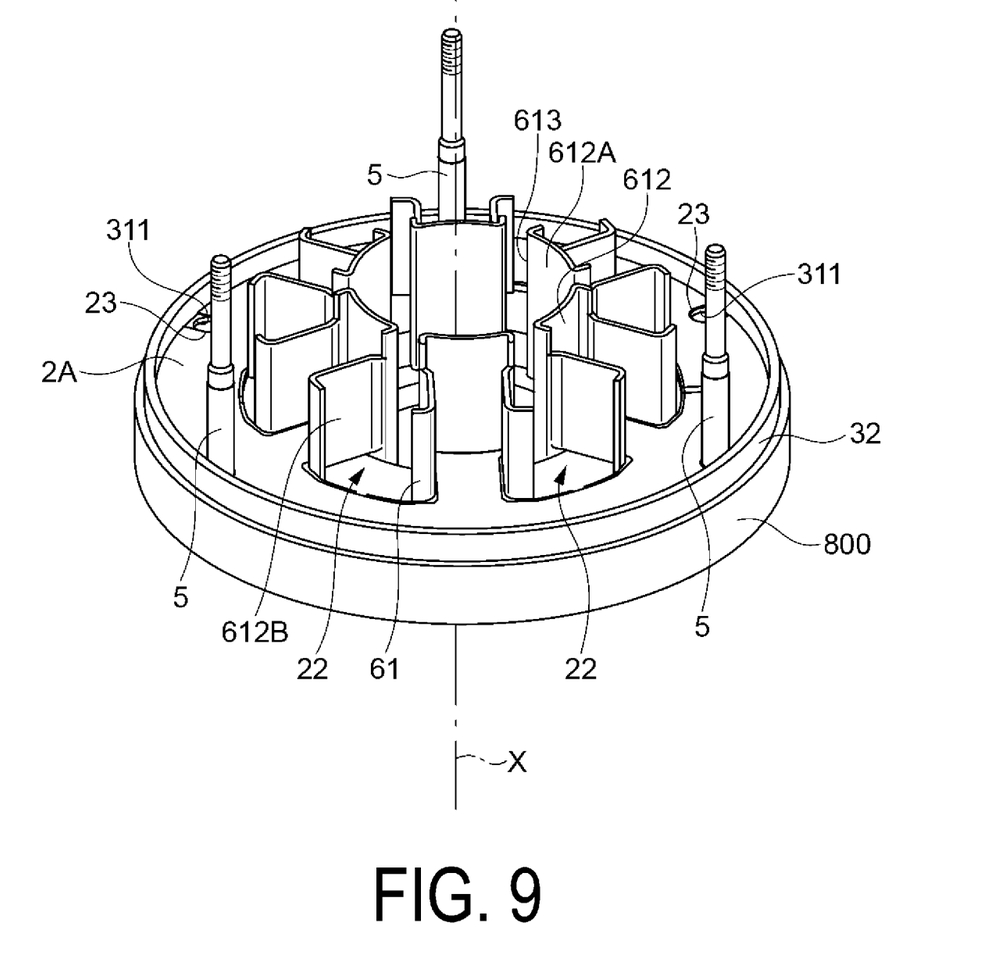
FIG. 9 is a perspective view illustrating the process of manufacturing the stator of the motor according to the embodiment being one example of the present invention.

Subsequently, as illustrated in FIG. 8, the holding body 61 is placed on the case 3 so that the bottom part 611 is disposed in the recess part 312. Subsequently, as illustrated in FIG. 9, after a magnetic body 2A constituting the stator core 2 is placed to be laid on top of the bottom part 611, another magnetic body 2A is laid on top of the magnetic body 2A, and this operation is repeated. At this time, the pillars 5 pass through the guided parts 23, and thus, the magnetic bodies 2A are guided by the pillars 5. The non-press-fitting portion 52, the second press-fitting portion 53, and the guiding part 54 of the outer peripheral surface 50 of the pillars 5 are in sliding contact with the curved surface part 231 having a semicircular cross section in the guided part 23 of the magnetic body 2A. Simultaneously with the above, an inner peripheral edge of the magnetic bodies 2A (a portion forming an inner peripheral side end part 241 of the teeth 24) is caused to be in sliding contact with the first wall part 612A, and thus, the magnetic bodies 2A are also guided by the first wall part 612A.

Figure 10:
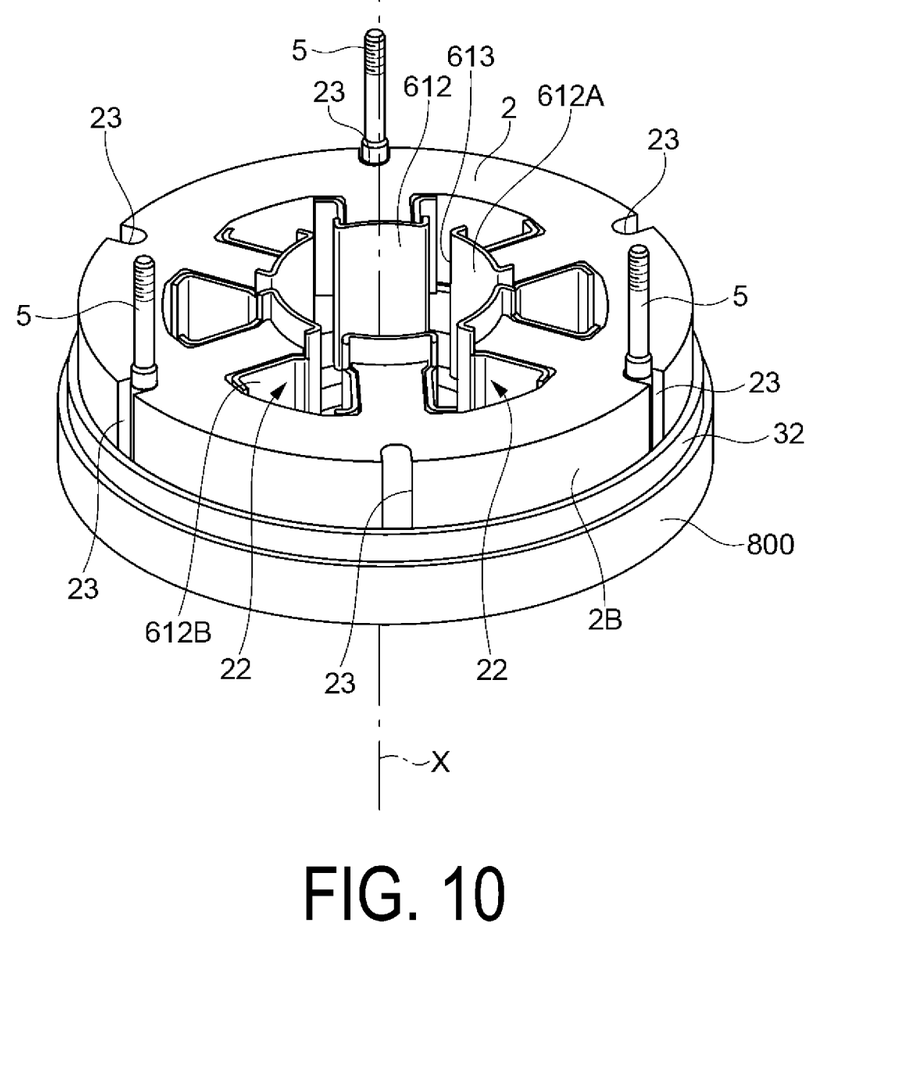
FIG. 10 is a perspective view illustrating the process of manufacturing the stator of the motor according to the embodiment being one example of the present invention.
Figure 11:
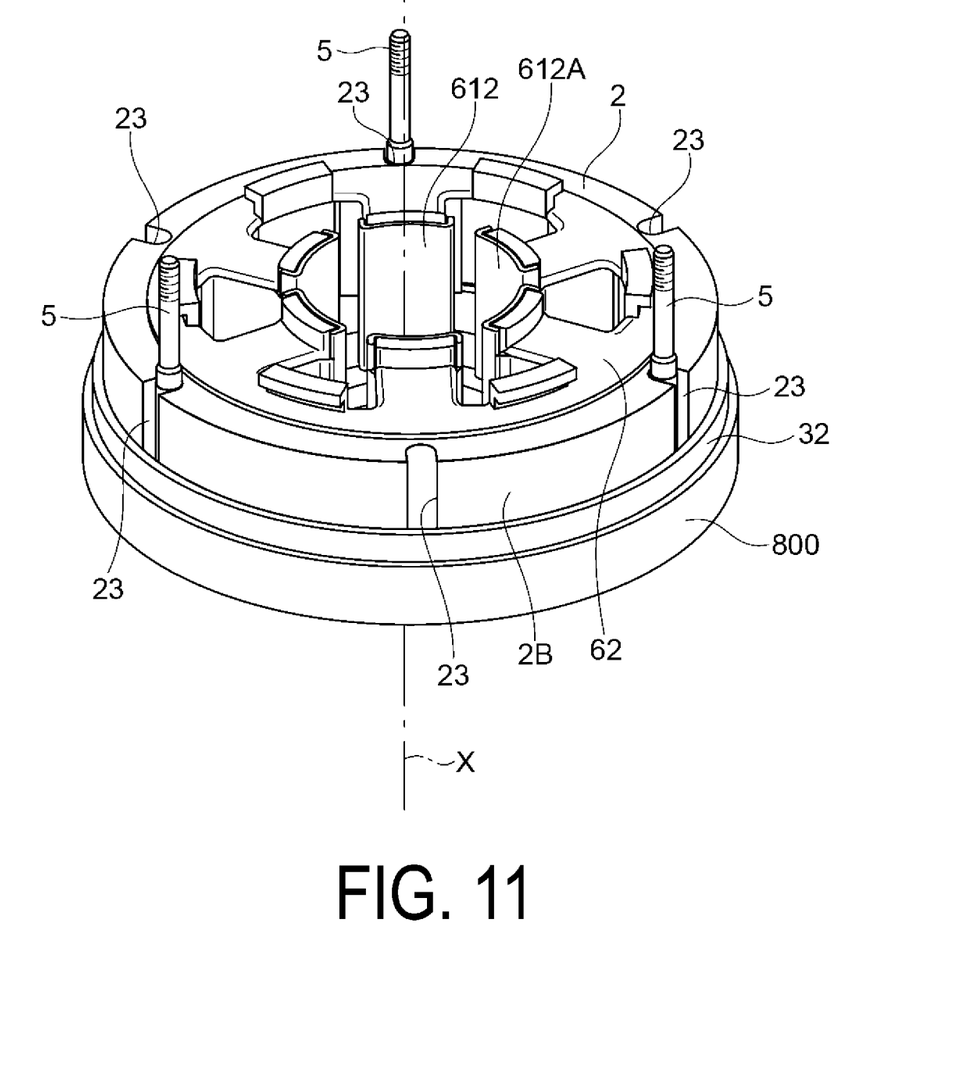
FIG. 11 is a perspective view illustrating the process of manufacturing the stator of the motor according to the embodiment being one example of the present invention.

As illustrated in FIG. 10, the stator core 2 is formed by stacking a predetermined number of the magnetic bodies 2A. The top surface of the stator core 2 is lower than an upper end part of the second wall part 612B by a predetermined height and is lower than the first wall part 612A. Therefore, the magnetic bodies 2A can be guided by the first wall part 612A even at a later stage during the process of stacking the magnetic bodies 2A. After the stacking of the magnetic bodies 2A is completed, the stator core 2 is covered by the lid body 62, as illustrated in FIG. 11. At this time, the first wall part 612A protrudes upward of the stator core 2, and the lid body 62 is guided by the first wall part 612A. Further, the dimension of each component is selected as following. The lid body 62 does not come into contact with the stator core 2 when the stator core 2 is covered by the lid body 62, and even if the lid body 62 comes into contact with the stator core 2, almost no load acts on the stator core 2.

Subsequently, as illustrated in FIG. 12, the cover 4 is placed on the lid body 62, and the pillars 5 are press-fitted into the cover 4. At this time, the pillars 5 may be press-fitted into the cover 4 by a hand press by using a pressing jig 801, for example. The second press-fitting portion 53 is press-fitted into the press-fitted part 411 until the second step part 531 comes into contact with the annular part 41. The dimension of the non-press-fitting portion 52 in the direction of the central axis X is designed to be larger than or equal to the thickness of the stator core 2, and thus, the load when the pillars 5 are press-fitted is not applied or is almost not applied to the stator core 2.

Subsequently, the coil 7 is formed by winding an electric wire around the teeth 24 and the insulator 6. When the electric wire is wound, a force toward the inside (the side of the teeth 24) acts on the plate-shaped portion constituting the second wall part 612B. At this time, since the fitted part 621 is formed in the lid body 62, the fitted part 621 restricts approaching of the plate-shaped portions of the second wall part 612B each other and a deformation of the holding body 61 can be suppressed. Therefore, the force for winding the electric wire does not act on the teeth 24, or the force for winding the electric wire does not easily act on the teeth 24.

Subsequently, the entire stator 10 is accommodated in the housing 30. At this time, a part of the pillar 5 at the end side (a portion formed with the male screw part 54) passes through a through hole 301, and the nut 40 is fastened to the male screw part 54. After the stator 10 is accommodated in the housing 30, the rotor 20 is provided to complete the motor 1. Note that the stator 10 and the rotor 20 may be accommodated substantially simultaneously in the housing 30 to complete the motor 1.

According to the present embodiment, the stator core 2 with the plurality of magnetic bodies 2A stacked is held by the case 3 and the cover 4, and thus, it is not necessary to use an adhesive or the like, and the space factor of the magnetic bodies 2A can be enhanced. At this time, the step parts 511 and 531 serving as a positioning part determine a relative positions of the case 3 and the cover 4 in the direction of the central axis X, and thus, an interval between the case 3 and the cover 4 in the direction of the central axis X can be prevented from being below a predetermined value. Therefore, when the plurality of magnetic bodies 2A are held by the case 3 and the cover 4, a load is unlikely to act on the magnetic bodies 2A, and thus, damage to the magnetic bodies 2A can be suppressed. Furthermore, the magnetic bodies 2A are guided in the direction of the central axis X by the pillars 5, and thus, the friction during the sliding contact is reduced, compared to a configuration employing a guiding member in sliding contact with the entire outer peripheral part 2B of the magnetic bodies 2A, and as a result, damage to the magnetic bodies 2A can be suppressed.

Moreover, the step parts 511 and 531 serving as a positioning part determine the positions of each of the case 3 and the cover 4 in the direction of the central axis X, and thus, the case 3, the cover 4, and the pillars 5 can be separately provided, and the assembly easiness can be improved.

Furthermore, the outer peripheral parts 2B of the plurality of magnetic bodies 2A are exposed from the holding body 61 in the radial direction, and thus, friction between the magnetic bodies 2A and the holding body 61 is less likely to occur when the plurality of magnetic bodies 2A are stacked, and damage to the magnetic bodies 2A can be suppressed.

Furthermore, the lid body 62 is supported by the end part 612C of the second wall part 612B, and thus, when the electric wire is wound around the insulator 6 to make the coil, a deformation of the holding body 61 can be suppressed, and a load acting on the magnetic bodies 2A can be suppressed.

Furthermore, when the housing 30 is fixed to the cover 4, the relative positions of the case 3 and the cover 4 are determined as described above, and thus, a load is unlikely to act on the magnetic bodies 2A and damage to the magnetic bodies 2A can be suppressed.

As described above, the motor according to the present invention is described with reference to a preferred embodiment, but the motor according to the present invention is not limited to the configuration of the embodiment described above. For example, in the embodiment described above, the pillars 5 position both the case 3 and the cover 4 to determine the relative positions of the case 3 and the cover 4. However, the relative positions of the case 3 and the cover 4 may be determined by positioning only any one of the case 3 and the cover 4. That is, the pillars 5 may be integrally formed with any one of the case 3 and the cover 4, and the relative positions of the case 3 and the cover 4 may be determined by positioning the other one of the case 3 and the cover 4.

Furthermore, in the embodiment described above, since the pillars 5 include the press-fitting portions 51 and 53 and the non-press-fitting portion 52, the pillars 5 can position the case 3 and the cover 4. However, a configuration for positioning a case and a cover is not limited to this, and the case and the cover may be positioned by forming, for example, fitting parts configured to fit into each other at the outer peripheral surface of a pillar and the inner peripheral surface of holes of the case and the cover.

In the embodiment describe above, the outer peripheral surface of the pillar 5 is in sliding contact with the curved surface part 231 of the guided part 23, that is, the curved surfaces are in sliding contact with each other. However, surfaces having the same shape (curved surfaces having equal curvature or flat surfaces) may be brought into sliding contact with each other, to increase a contact area between the pillar 5 and the guided part 23 and reduce the force applied to the magnetic bodies 2A, or sliding contact parts having different shapes (a combination of a curved surface and a flat surface, a combination of curved surfaces having different curvatures, and a combination of a curved surface or a flat surface and a corner part) may be brought into sliding contact with each other, to decrease the contact area and reduce the frictional force. A mode of the pillar 5 and the guided part 23 being in sliding contact with each other may be appropriately selected according to the friction coefficient of the sliding contact portion, the strength of the magnetic bodies 2A, and the like.

Furthermore, in the embodiment described above, the magnetic bodies 2A are guided by the pillars 5 passing through the guided part 23 having a recess shape. However, a configuration for guiding the magnetic bodies 2A is not limited to this. For example, a guided part having a through hole shape may be formed in magnetic bodies, and a pillar may be passed through the guided part. Furthermore, a guided part having a convex shape may be formed in an outer peripheral part of magnetic bodies and a recess part may be formed at the outer peripheral surface of the pillar 5, and thus, the guided part having a convex shape is placed in the recess part of the pillar 5 to guide the magnetic bodies. Moreover, the guided part having a convex shape of the magnetic bodies may be sandwiched by two pillars to guide the magnetic bodies.

Furthermore, in the embodiment described above, the outer peripheral part 2B of the stator core 2 is exposed from the holding body 61 in the radial direction. However, the outer peripheral part 2B of the stator core 2 may be partially or completely covered by a holding body or another portion of an insulator.

Moreover, in the embodiment described above, in the insulator 6, the lid body 62 is supported by the end part 612C of the second wall part 612B at the side of the cover 4. However, when the second wall part 612B does not easily deform, or when the force applied to the second wall part 612B during the winding of the electric wire in making the coil 7 is small, the lid body 62 may not be supported by the end part 612C of the second wall part 612B at the side of the cover 4.

Furthermore, in the embodiment described above, the housing 30 is fixed to the cover 4; however, the housing 30 may be configured to be fixed to the case 3. Moreover, the housing 30 may be fixed to the case 3 or the cover 4 via a member other than the pillar 5, or may be directly fixed to the case 3 or the cover 4. Furthermore, as in the embodiment described above, the cover 4 and the nut 40 sandwich and fix a part of the housing 30; however, in addition to this or instead of this, the case 3 and the nut 40 may sandwich and fix a part of the housing 30.

In addition, the motor according to the present invention may be appropriately modified by a person skilled in the art according to conventionally known knowledge. Such modifications are of course included in the scope of the present invention as long as these modifications still include the configuration in the present invention.

REFERENCE SIGNS LIST

1 Motor, 10 Stator, 20 Rotor, 30 Housing, 2A Magnetic body, 23 Guided part, 3 Case, 4 Cover, 5 Pillar, 50 Outer peripheral surface, 511, 531 Step part (positioning part), 54 Guiding part, 6 Insulator, 61 Holding body, 611 Bottom part, 612 Wall part, 612C End part, 62 Lid body

The invention claimed is:

1. A motor comprising:
 a housing including an opening,
 a rotor including a bearing provided at the opening of the housing,
 a stator including a case and a cover accommodated in the housing,
  wherein the stator includes a plurality of magnetic bodies stacked in an axial direction and formed of an amorphous alloy;
  wherein the plurality of magnetic bodies are held by the case and the cover,
 wherein the case is configured to hold the plurality of magnetic bodies, the case being formed of a non-magnetic metal material;
 wherein the cover is configured to cover the case, the cover being formed of a non-magnetic metal material; and
 a pillar including a guiding part configured to guide the plurality of magnetic bodies in the axial direction,
  wherein the plurality of magnetic bodies include a guided part guided by the pillar,
  the pillar includes an outer peripheral surface including positioning parts, and
  the positioning parts determine relative positions of the case and the cover in the axial direction and prevent the case and the cover in the axial direction from being closer to the plurality of magnetic bodies.

2. The motor according to claim 1,
 wherein the positioning parts position each of the case and the cover.

3. The motor according to claim 1, comprising:
 an insulator disposed between the case and the cover in the axial direction,
 wherein the insulator includes a holding body configured to hold the plurality of magnetic bodies and a lid body, and
 outer peripheral parts of the plurality of magnetic bodies are exposed from the holding body in a radial direction.

4. The motor according to claim 3,
 wherein the holding body includes a bottom part at a side of the case and a wall part provided at the bottom part, and
 the lid body is supported by an end part of the wall part at a side of the cover.

5. The motor according to claim 1,
 wherein the housing is fixed to the case or the cover.

* * * * *